US008816045B2

(12) United States Patent
Frank et al.

(10) Patent No.: US 8,816,045 B2
(45) Date of Patent: Aug. 26, 2014

(54) MEMBRANE STRIPPING PROCESS FOR REMOVING VOLATILE ORGANIC COMPOUNDS FROM A LATEX

(71) Applicants: Dow Global Technologies LLC, Midland, MI (US); The Regents of the University of Minnesota, Minneapolis, MN (US)

(72) Inventors: Timothy C. Frank, Midland, MI (US); Edward L. Cussler, Edina, MN (US)

(73) Assignees: Dow Global Technologies LLC, Midland, MI (US); Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 13/788,089

(22) Filed: Mar. 7, 2013

(65) Prior Publication Data

US 2013/0237679 A1 Sep. 12, 2013

Related U.S. Application Data

(60) Provisional application No. 61/607,768, filed on Mar. 7, 2012.

(51) Int. Cl.
*C08G 63/00* (2006.01)
*C08G 63/02* (2006.01)

(52) U.S. Cl.
USPC ........... 528/483; 528/423; 528/480; 528/481; 528/500

(58) Field of Classification Search
USPC ................. 528/423, 480, 481, 500
See application file for complete search history.

(56) References Cited

U.S. PATENT DOCUMENTS

| 4,715,217 | A | | 12/1987 | Coyne et al. |
| 5,516,818 | A | * | 5/1996 | Chen et al. ..................... 523/332 |
| 6,075,073 | A | | 6/2000 | McGlothlin et al. |
| 2006/0096715 | A1 | | 5/2006 | Suzuki et al. |

FOREIGN PATENT DOCUMENTS

| EP | 0657205 A2 | 6/1995 |
| EP | 0728765 A1 | 8/1996 |
| WO | 01/44350 A1 | 6/2001 |

OTHER PUBLICATIONS

Jackson, Elizabeth A., et. al., "Nanoporous Membranes Derived from Block Copolymers: From Drug Delivery to Water Filtration," ACSNANO, vol. 4, No. 7, pp. 3548-3553.
Jacobs, Marc, et al., "Monomer Recovery in Polyolefin Plants Using Membranes—An Update," Membrane Technology & Research, Inc., Menlo Park, CA, pp. 1-10, Mar. 1999.
I. Abou-Nemeh, S. Majumdar, et al., "Demonstration of a Pilot-Scale Pervaporation Systems for Volatile Organic Compound Removal from a Surfactant Enhanced Aquifer Remediation Fluid." Environmental Progress, 20, 64-73 (2001).
E. Bringas, et al., "Overview of the Mathematical Modeling of Liquid Membrane Separation Processes in Hollow Fiber Contactors," J. Chem. Technol. Biotechnol., 84, 1583-1614 (2009).
S. R. Wickramasinghe, J. J. Semmens, and E. L. Cussler, "Mass Transfer in Various Hollow Fiber Geometries," J. Memb. Sci., 69, 235-250 (1992).
M. A. Shannon, P. W. Bohn, M. Elimelech, J. G. Georgiadis, J. B. Marinas and A. M. Mayes, "Science and Technology for Water Purification in the Coming Decades," Nature 452, 301-310 (2008).
T. C. G. Kibbey, K. D. Pennell and K. F. Hayes, "Application of Sieve-Tray Air Strippers to the Treatment of Surfactant-Containing Wastewaters," AIChE J., 47, 1461-1470 (2001).
G. Zhang and E. L. Cussler, "Distillation in Hollow Fibers," AIChE J., 49, 2344-2351 (2003).
J. B. Chung, J.P. DeRocher, and E. L. Cussler, "Distillation with Nanoporous or Coated Hollow Fibers," J. Membrane Sci., 257, 3-10 (2005).

* cited by examiner

*Primary Examiner* — Terressa Boykin
(74) *Attorney, Agent, or Firm* — Reid S. Willis

(57) ABSTRACT

The present invention relates to a method of removing volatile organic compounds (VOCs) from a latex using a membrane.

10 Claims, 1 Drawing Sheet

Schematic of Process for Removing VOCs from a Latex
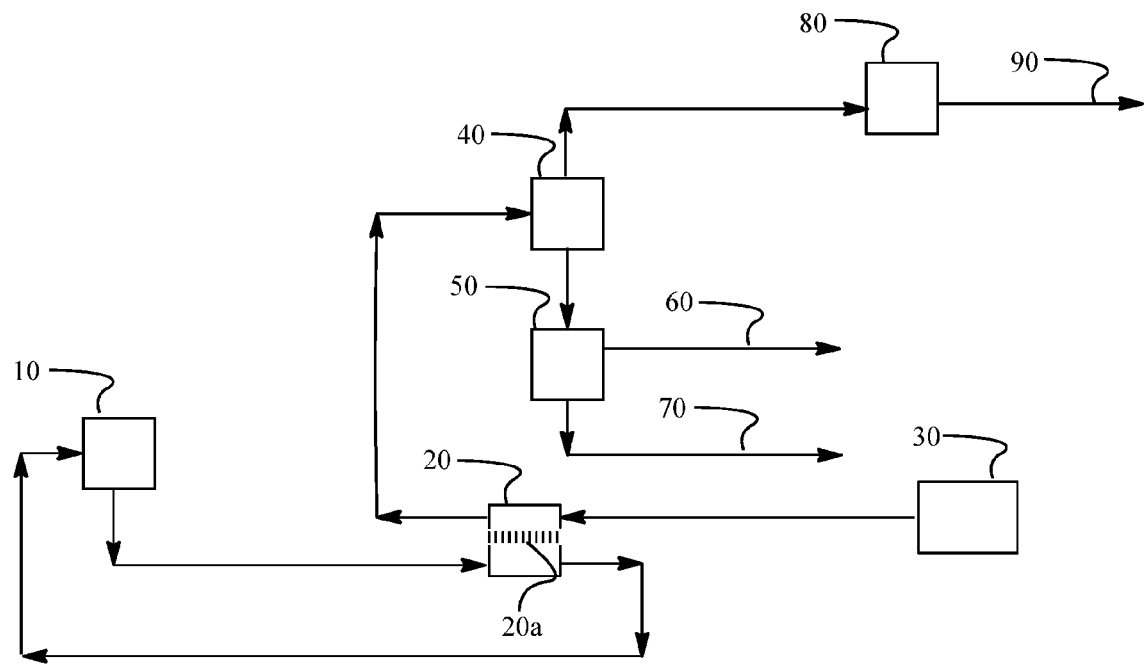

MEMBRANE STRIPPING PROCESS FOR REMOVING VOLATILE ORGANIC COMPOUNDS FROM A LATEX

BACKGROUND OF THE INVENTION

The present invention relates to a process for removing volatile organic compounds (VOCs) from a latex using a membrane.

Latex paints often contain VOCs at levels that produce undesirable odors. These VOCs, typically ppm levels of low molecular weight ketones, alcohols, acetates, and aldehydes, are not essential for the paint's performance but are added to facilitate various steps in the paint's manufacture. Accordingly, paints free of these odor producing agents are desired.

Removal or "stripping" of trace amounts of low molecular weight organics can be accomplished by contacting a liquid containing VOCs with a gas, such as air, or nitrogen, or steam. The gas can be passed through a sparger to create large numbers of small bubbles dispersed within the liquid. The bubbles rise to the surface of the bulk liquid, carrying a portion of the VOCs with them. Other well-known methods for carrying out stripping operations involve contacting liquid and gas in a trayed or a packed stripping tower. In all of these devices, the organic compounds transfer from the liquid phase to the gas phase due to favorable liquid-vapor equilibrium partition ratios or relative volatilities.

Although these conventional stripping processes are widely used for treating aqueous streams, these techniques are not as efficient for removing VOCs from latexes. First, because latexes are stabilized by significant amounts of surfactant, sparging produces high volumes of foam during the stripping operation, thereby causing major problems in the processing and packaging of the finished latex. Second, there is a need for a more economical process that can increase interfacial area for mass transfer and thus reduce the size and cost of the stripping equipment. It would therefore be an advance in the art of VOC removal to find a way to reduce concentrations of VOCs in latex paints in a more efficient manner.

SUMMARY OF THE INVENTION

The present invention provides a method comprising flowing a VOC-containing latex along a first surface of a membrane, wherein the latex has a solids content in the range of from 20 to 65 weight percent, and concomitantly flowing a gas along a second surface opposing the first surface of the membrane, wherein the volatile organic compound passes through the membrane and into the flowing gas, thereby reducing the concentration of the volatile organic compound in the latex. The present invention addresses a need by providing a way of efficiently removing VOCs from a latex without production of foam.

BRIEF DESCRIPTION OF THE DRAWING

FIG. 1 is a schematic of an embodiment of a process for removing VOCs from a latex using a membrane.

DETAILED DESCRIPTION OF THE INVENTION

The present invention provides a method comprising flowing a VOC-containing latex along a first surface of a membrane, wherein the latex has a solids content in the range of 20 to 65 weight percent, and concomitantly flowing a gas along a second surface opposing the first surface of the membrane, wherein the volatile organic compound passes through the membrane and into the flowing gas, thereby reducing the concentration of the volatile organic compound in the latex.

The membrane is permeable to VOCs and, in one aspect, is a nanoporous hydrophobic polymeric membrane characterized by pore diameters in the range of 1 nm to 1000 nm, preferably in the range of 1 nm to 100 nm. In this aspect, the polymer is sufficiently hydrophobic so that water does not readily wet the clean polymer membrane surface prior to use; that is, so that water tends to form spherical beads of water droplets rather than thin films on the surface of the polymer. Thus, the nanoporous membrane is sufficiently hydrophobic to inhibit transport of liquid water through the membrane by, for example, wicking or pressure driven transport of water into the membrane. Examples of hydrophobic materials suitable for the nanoporous membrane include polyethylene, polypropylene, ethylene-propylene copolymer, polyvinylidene fluoride, or polytetrafluoroethylene.

In another aspect, the membrane is nonporous but highly permeable to organic solutes that are to be removed. Materials suitable for this membrane include cellulose acetate, crosslinked polyvinylalcohol, polysulfone, polyethersulfone, silicone, polyamide, and polyimide.

The membrane may also comprise a composite membrane, which is a thin nanoporous or nonporous film supported on the surface of a thicker support membrane that provides mechanical strength; this support membrane is preferably macroporous, with pore diameters typically in the range of 1000 nm to 10,000 nm, to facilitate transport to the discriminating film. The film may be made of any polymer with the required permeability to VOCs. The support membrane may be made of any polymer with the required mechanical strength, including hydrophobic and hydrophilic polymers.

The membrane is preferably provided in the form of a module, which is a holder for the membrane, most commonly a hollow fiber membrane module, a plate and frame membrane module, a flat spiral wound membrane module, a shell and tube module (also known as a fiber bundle module), or a combination thereof. These modules are well known in the art.

As used herein, the term "latex" is used to describe a stable aqueous dispersion of polymer particles with a solids content in the range of from 20 weight percent solids, preferably from 35, more preferably from 40 weight percent solids, to 65 weight percent solids, preferably to 60 weight percent solids.

In one embodiment of the present invention, the latex containing the VOCs is recirculated from a reservoir containing the latex, then contacted with continuous flowing with a first surface of the membrane, then directed back into the reservoir. In another embodiment of the present invention, the latex containing the VOCs is contacted with continuous flowing across a first surface of the membrane in a single pass without recirculation, provided that sufficient membrane area is present to achieve the desired VOC reduction. In each case, a continuous stream of the gas may be passed in a direction counter to the flow of the latex along the opposing surface of the membrane to improve mass transfer efficiency. The VOCs from the latex stream transfer through the membrane and into the stream containing the flowing gas. To minimize the transfer of water from the latex through the membrane and into the flowing gas, it is preferred that the gas be a humidified gas or steam, which promotes the preferential transfer of VOCs across the membrane; at the same time, the water-containing gas minimizes drying of the membrane surface, which tends to cause a reduction in the rate of VOC transfer and the amount of VOC removed from the latex due to fouling of the membrane. A further benefit of using humidified gas or steam is the minimization or avoidance of increasing the concentration of the latex due to the removal of water, in situations where it is desirable to maintain the concentration of the latex. On the other hand, it may be useful to transfer both water and VOCs across a membrane in cases where it is desired to reduce VOC levels and to increase the solids content of the latex.

As used herein, the term "humidified gas" refers to a gas, preferably air or nitrogen, sufficiently saturated with water to minimize fouling of the membrane, as measured by a reduction in the rate at which VOCs pass across the membrane. Preferably, the humidified gas is saturated or nearly saturated with water (i.e., at least 90% relative humidity, preferably 100% relative humidity).

The process is also advantageously operated at a temperature sufficiently above ambient temperature to increase the rate at which VOCs pass across the membrane but not so high as to promote fouling of the membrane; a preferred temperature range for the membrane is from 35° C. to 70° C. Accordingly, when steam is used to carry the VOCs away from the membrane, the process is operated at a pressure corresponding to the vapor pressure of water at the desired operating temperature, preferably at a pressure in the range of from 55 to 235 mm Hg, depending on the temperature used. For example, if it is desired to run the process at 50° C., the vacuum would be adjusted to about 93 mm Hg, which is the pressure at which water boils at 50° C. The pressure can be controlled using a standard vacuum pumping system connected to the membrane module and the condenser. The required vacuum may be generated using any of a variety of devices including liquid-ring vacuum pumps, oil-sealed vacuum pumps, oil-less vacuum pumps, steam jets, or a combination of these vacuum producing devices.

Depending on the type of membrane or membrane module used, humidified gas may be preferred to using steam under partial vacuum. For example, when the membrane is a flat spiral wound membrane, humidified gas is generally the preferred means of carrying away VOCs from the membrane because operation of a spiral-wound membrane under vacuum is compromised due to pressure drop limitations within a typical module. Pressure drops in other membrane configurations such as plate and frame, hollow fiber, or shell and tube tend to be smaller. When the membrane is of a hollow fiber or shell and tube configuration, it is preferred to pass the latex through the fibers or tubes while passing the humidified air or steam across the outer surface of the fibers or tubes. Passing of the latex through tubes reduces the tendency of latex to coagulate in dead zones within the module.

VOCs passing across the membrane and into the flowing stream of humidified gas or steam may then be treated by using any of a variety of known treatment technologies designed to reduce the VOC content in the gas to a level that is sufficient for its disposal after use or for some subsequent use. For example, if humidified air is used as the stripping medium for the invention, and the air is to be vented to the atmosphere for disposal after use, then the VOC-laden air may be treated with known emissions control technologies including processing by: a) a catalytic or non-catalytic thermal oxidation unit or incinerator; b) a condenser to condense a portion of the VOC content; c) an adsorbent to adsorb and remove a portion of the VOC content, such as an activated carbon fixed-bed scrubber; or d) any combination of these emissions control technologies. Gases treated in this way may be discharged to the atmosphere for disposal (in the case of air or nitrogen), or they may be recycled back to the membrane stripping process, provided that the VOC content has been reduced to a sufficiently low level.

If steam is used as the stripping medium, the VOC-enriched steam may be condensed in a conventional condenser-type cooling heat exchanger. The resulting condensate liquid may be a single aqueous phase containing dissolved VOCs, or it may consist of an aqueous layer saturated with VOCs and a separate organic layer of condensed VOCs. The organic layer will form when the amount of VOC in the VOC-enriched steam entering the condenser exceeds the saturation limit in the condensate water. The aqueous condensate layer may be treated using, for example, biological waste-water treatment, adsorption onto activated carbon, or a combination thereof. The organic condensate layer may be treated using for example, incineration, or it may be collected for use in another process or recycled for use in an upstream process, such as latex manufacture.

Referring to FIG. 1, which represents a schematic of one embodiment of the invention, a latex containing VOCs is directed from a latex reservoir (10) to a membrane module (20) where the latex flows across the surface of a membrane (20 a); the latex then exits module (20) and is recirculated back to reservoir (10). VOCs pass from the latex through the membrane (20 a) and are carried away from the module (20) by a flowing stream of steam, or air or nitrogen saturated with water that can be heated by a humidifier or steam generator (30); alternatively, but not preferably, the VOCs can be carried away from the module by a flowing stream of a dry gas such as dry air or nitrogen. The stream containing the VOCs can then be directed to a condenser (40), which condenses a portion of the gaseous stream, thereby forming a liquid condensate containing some amount of water and VOCs, which can then be directed to a decanter (50). If the amount of VOCs in the condensate exceeds the water-solubility limit of the VOCs, two liquid layers are formed and can be separated through outlets (60) and (70). Any non-condensed vapor or gas can be pumped away with a vacuum pumping system (80) and redirected through a separate outlet (90).

The process of the present invention is capable of reducing the VOC content in a relatively high solids content latex to a level that eliminates or substantially eliminates odor from malodorous components, or reduces the level of toxic components to innocuous levels, cleanly and efficiently.

EXAMPLES

The following example is for illustrative purposes only and is not intended to limit the scope of the invention.

Example 1

An aqueous acrylic polymer latex containing polymer particles on the order of 0.1 to 0.2 µm in diameter and with a total polymer particle concentration of 50.3 wt % was passed through a membrane stripping apparatus similar to that shown in FIG. 1 at a temperature of approximately 50° C. The membrane was a flat hydrophobic polypropylene membrane obtained from GE Osmonics with a cross-sectional area of 5 cm$^2$ and reported by GE Osmonics to contain 20-nm diameter pores. Latex (200 mL) was recirculated using a peristaltic tubing pump from a feed reservoir through the membrane holder and back to the reservoir at a rate of about 100 mL/min. Dry nitrogen gas was passed through the opposite side of the membrane holder at a rate of about 1.1 standard cubic feet/min. Flows of latex and nitrogen were maintained constant while VOC liquid condensate was collected in the condenser, which was cooled with liquid nitrogen at −196° C. The composition of the condensed organic liquid collected from the condenser was analyzed using an Agilent HP6890 gas chromatograph (GC), equipped with an Agilent HP-PLOT Q 30 m length×0.530 mm diameter capillary column (40.0-μm film thickness) and a flame ionization detector (FID). This resultant chromatogram and the total weight of collected condensate were used to determine the flux of specific VOCs through the membrane in terms of grams transferred per square centimeter of membrane area per hour. Concentrations of methanol, ethanol, acetone, ethyl acetate, and t-butanol were measured by injecting 2.0 μm samples of the condensed VOC liquid obtained from the condenser. The elution order and retention times (min) of the resulting GC chromatogram were: methanol (4.2), ethanol (5.2), acetone (5.7), ethyl acetate (6.8), and t-butanol (7.3). The initial concentrations of these VOCs in the latex feed and the fluxes measured after about 5 h of operation are listed in Table 1. After 20 h of operation, the measured fluxes decreased by about 5% or less, indicating that little or no fouling of the membrane occurred during this time. No latex was detected in the condensate from the condenser, indicating that no foam was generated and carried into the gas stream leaving the membrane holder.

TABLE 1

Results of Example 1 Obtained using a Nanoporous Polypropylene Membrane

| VOC | Concentration in Latex Feed (ppm by wt) | Flux after about 5 h (grams/cm$^2$/h) |
|---|---|---|
| Acetone | 2500 | 7.32E−05 |
| t-Butanol | 236 | 2.10E−06 |
| Methanol | 127 | 1.39E−05 |
| Ethanol | 123 | 1.23E−05 |
| Ethyl acetate | 25 | 1.69E−05 |

The invention claimed is:

1. A method comprising flowing a VOC-containing latex along a first surface of a membrane, wherein the latex has a solids content in the range of from 20 to 65 weight percent, and concomitantly flowing a gas along a second surface opposing the first surface of the membrane, wherein the volatile organic compound passes through the membrane and into the flowing gas, thereby reducing the concentration of the volatile organic compound in the latex.

2. The method of claim 1 wherein the membrane is a hollow fiber membrane, a plate and frame membrane, a flat spiral wound membrane, or a shell and tube membrane, or a combination thereof.

3. The method of claim 2 wherein the flowing gas passed along the second surface of the membrane is steam at a temperature in the range of 35° C. to 70° C. and the membrane is a hollow fiber membrane, a plate and frame membrane, or a shell and tube membrane, or a combination thereof.

4. The method of claim 2 wherein the flowing gas passed along the second surface of the membrane is air or nitrogen saturated or nearly saturated with water and the gas is maintained at a temperature in the range of 35° C. to 70° C.

5. The method of claim 1 wherein the membrane is provided as part of a module.

6. The method of claim 1 wherein the membrane is a nanoporous hydrophobic membrane, and the latex has a solids content in the range of from 35 to 65 weight percent.

7. The method of claim 6 wherein the nanoporous hydrophobic membrane is a polyethylene, a polypropylene, a polypropylene-polyethylene copolymer, a polystyrene, a polyvinylidene fluoride, or a polytetrafluoroethylene.

8. The method of claim 5 wherein the membrane is a cellulose acetate, crosslinked polyvinylalcohol, polysulfone, polyethersulfone, silicone, polyamide, or a polyimide.

9. The method of claim 5 wherein the membrane is in the form of a nanoporous or nonporous film coated on the surface of a thicker macroporous support membrane.

10. The method of claim 1 wherein the concentration of VOCs in the latex is reduced to eliminate or substantially eliminate odor from malodorous components and/or to reduce levels of toxic components to innocuous levels.

* * * * *